United States Patent … [11] 3,588,449

| [72] | Inventor | Thomas Glynn Paterson<br>Valley Forge, Pa. |
| [21] | Appl. No. | 629,958 |
| [22] | Filed | Apr. 11, 1967 |
| [45] | Patented | June 28, 1971 |
| [73] | Assignee | RCA Corporation |

[54] ELECTRONIC CHECK-CASHING SYSTEM
13 Claims, 4 Drawing Figs.

[52] U.S. Cl. .................................................. 235/61.7B,
340/149A
[51] Int. Cl. .................................................... G06f 7/04
[50] Field of Search.......................................... 346/22;
194/4; 340/172.5, 149, 146.2; 235/61.115, 61.7
(b); 283/7

[56] References Cited
UNITED STATES PATENTS

| 3,038,157 | 6/1962 | Simjian | 346/ZZ |
| 3,039,582 | 6/1962 | Simjian | 194/4 |
| 3,184,714 | 5/1965 | Brown, Jr. et al. | 340/149 |
| 3,308,238 | 3/1967 | Brothman et al. | 340/149A |
| 3,383,657 | 5/1968 | Claasseu et al. | 340/149A |
| 3,221,304 | 11/1965 | Enikeieff | 235/61.7UX |

Primary Examiner—Daryl W. Cook
Assistant Examiner—William W. Cochran
Attorney—John V. Regan ABSTRACT: An apparatus is disclosed for dispensing currency automatically, on demand, to a customer of a bank. A memory stores a secret "Swiss" bank number for each account and is addressable upon entry of a customer's identification or account card. Manual entry of the correct Swiss bank number by the customer enables the customer to communicate with a currency dispensary unit.

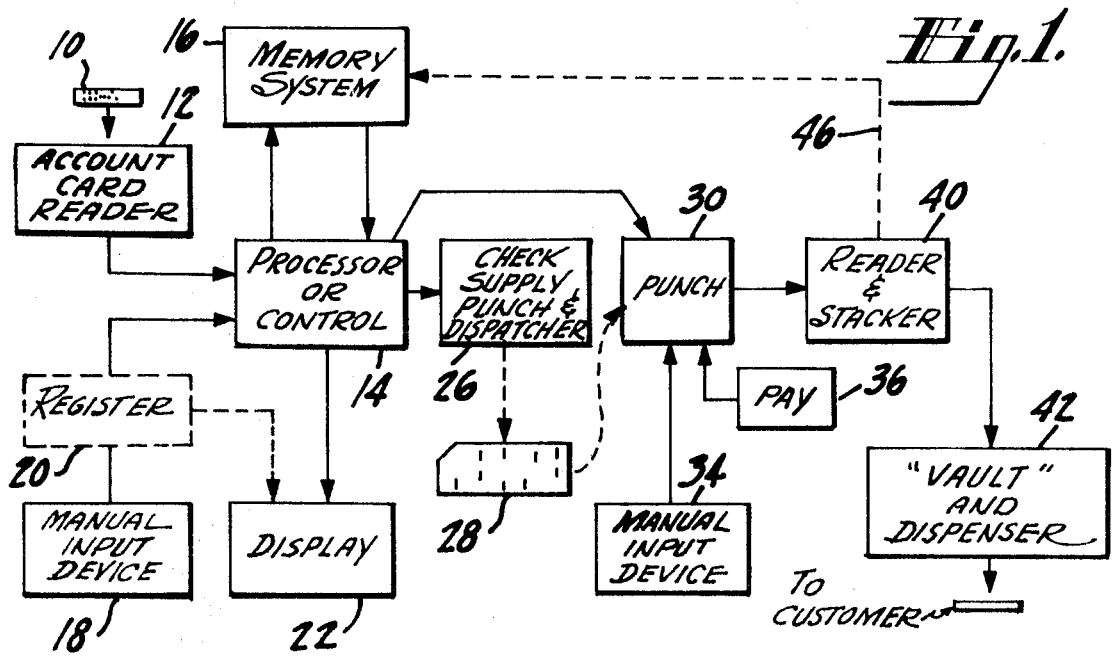
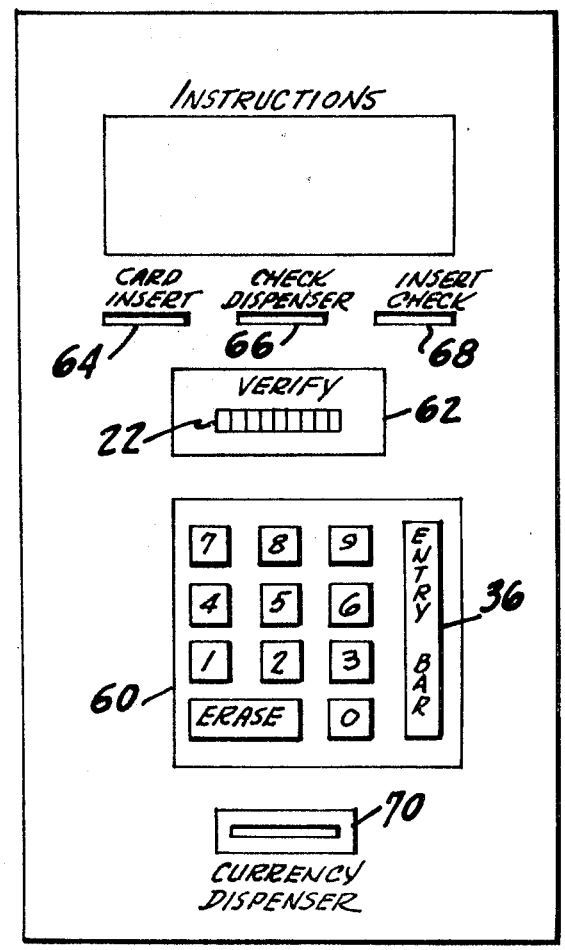

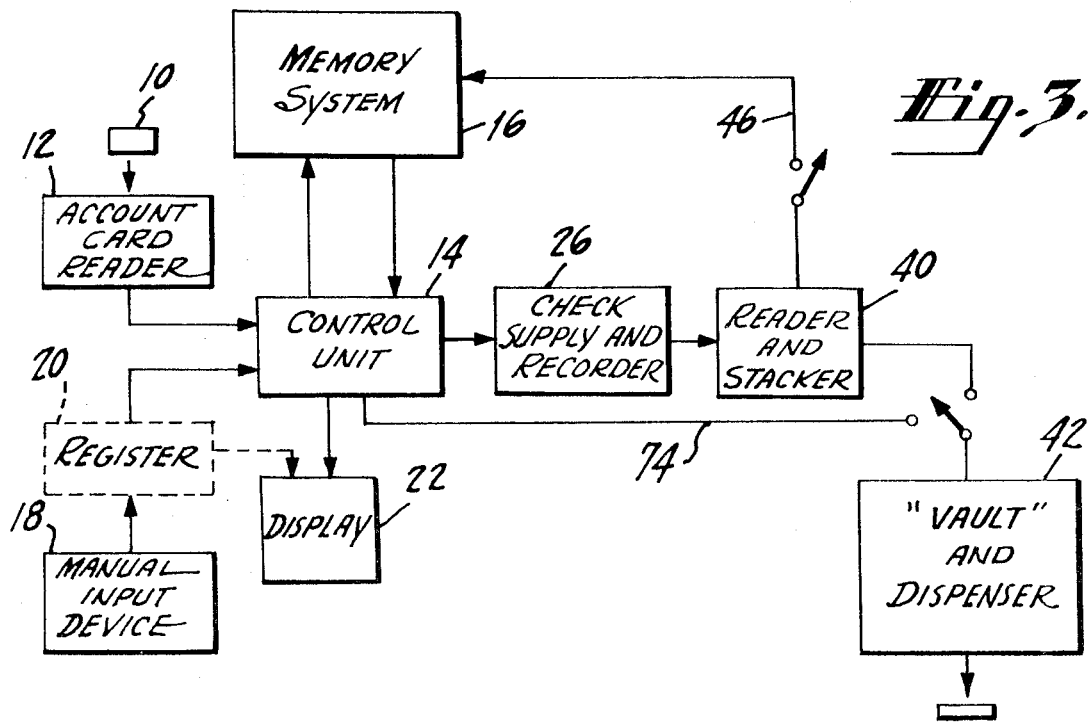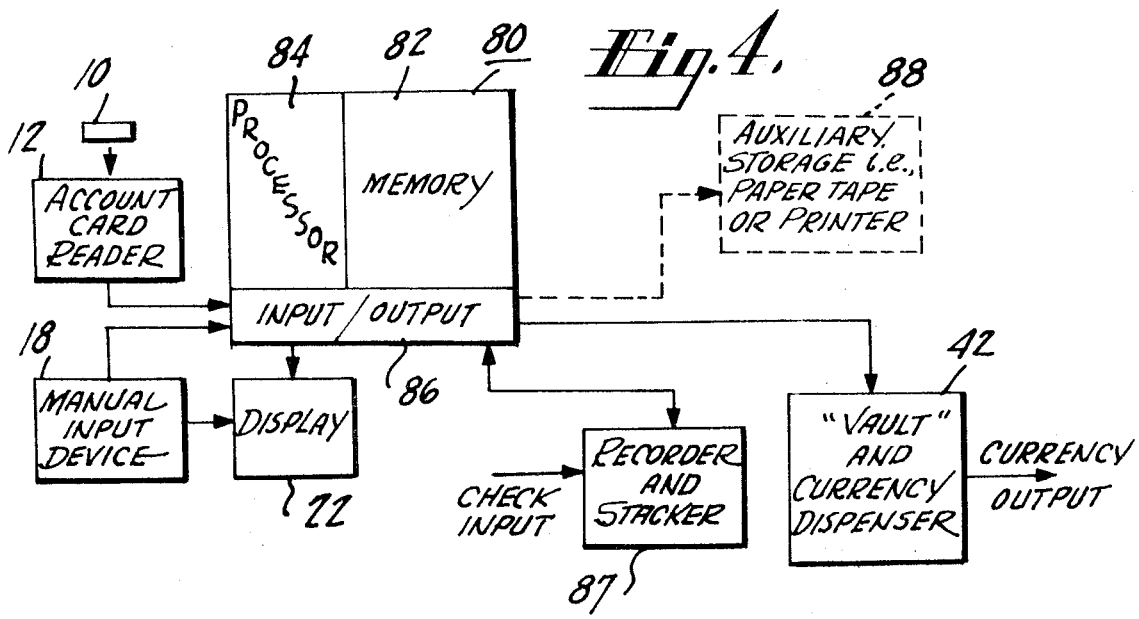

ELECTRONIC CHECK-CASHING SYSTEM

BACKGROUND OF THE INVENTION

Many banking institutions have facilities for a customer to make deposits without requiring the services of a bank teller. An example is the night depository vault whereby a customer, by inserting a key and unlocking a metal door or window, may deposit a money bag or envelope into a tamperproof chamber or vault. At the present time, banks do not have any provision for cashing a check for a customer without the intervention of a teller or other bank employee. If such a facility were available, it not only would make it possible for a customer to cash a check during nonbanking hours, but also it would speed check-cashing operations and reduce operating costs by providing an automated system which could be used during regular banking hours. In fact, check-cashing machines could be installed at supermarkets, airports and other business locations remote from the bank.

BRIEF DESCRIPTION OF THE INVENTION

Apparatus embodying the invention includes a memory system addressed by the output of customer identification or account card reader, and a manual input device by which the customer enters his identification or secret bank number into the machine. This latter number is compared with the secret bank number stored in the memory at the addressed location. The customer inputs data designating the amount to be withdrawn and, if there is an identity of comparison, receives the requested currency automatically from a currency dispenser in the machine. In the preferred embodiment of the invention, the customer also inserts a signed check into the machine.

BRIEF DESCRIPTION OF THE DRAWINGS

In the accompanying drawing, like reference characters denote like components, and FIG. 1 is a functional block diagram of a check cashing system embodying the invention;

FIG. 2 is an example of a suitable front panel of the machine accessible to the customer; and FIGS. 3 and 4 are block diagrams of other embodiments of the invention.

DETAILED DESCRIPTION OF THE INVENTION

A check-cashing system embodying the invention contemplates the use of an identification or account card issued by the bank to each of its customers that are to be permitted the use of its automated check-cashing system. This card may take the general form of any of the credit cards in use in today's business operations. The card may contain, among other data, the customer's account number, his name and address, etc., and some or all of the data may be in coded form. The data may be embossed on the card, or the card may be a magnetic card encased in plastic and having the information magnetically recorded thereon, by way of example. In addition, each customer is assigned an identification number, which preferably is a secret, or "Swiss" bank account number (private verification number) known only to the customer and to the bank. The term "number," as used herein and in the appended claims, is not meant to be limited to cardinal numerals, but to include also alphabetic characters.

Refer now to FIG. 1. A customer wishing to cash a check or withdraw money from the bank inserts his account card 10 into a card reader 12, the output of which is fed to a control unit or processor 14. In addition, the customer inputs his secret bank number into the system via a manual input device 18, e.g. a keyboard. This number is fed to the control unit 14 by way of a register 20. Alternatively, and depending upon the details of the control unit 14, the register could be omitted and the output of input device 18 could be fed directly to the control unit. A display device 22 displays the number entered via the input device 18 to enable the customer to check the accuracy of his entry.

A memory system 16 stores data for each user's account. This data may include the status of the account, number of withdrawals in a given period, etc. In addition, the memory stores either or both of the account card data, e.g., account numbers, and corresponding secret bank number, and is addressable by the output of either the card reader 12 or the manual input device 18. The size of the memory system 16 and the details of the control unit 14 will depend upon the location and application of the machine, the data-handling facilities available at the bank, and other factors.

By way of example, the memory system 16 could be a small fixed memory contained in the machine itself, in which case its storage capability would be relatively limited. On the other hand, the memory system 16 and the control unit 14 could be the memory and processor of the bank's central data processing system. In that event, communication between the processor and the check-cashing machine would be by way of telephone lines in the case where the machine was at a remote location relative to the bank, e.g. at a supermarket.

In any event, it is a prime function of the memory to provide a means for verifying the correct relationship between the account card and secret bank number entered by the customer. The memory preferably is arranged to be addressed by the output of the card reader 12, e.g., the account number read thereby and, when, addressed, supplies the secret bank number for the corresponding account. That number is compared with the secret number entered via the manual input device 18. Alternatively, the secret bank number entered via manual input device 18 could be used as the memory address, in which case the memory would be arranged to supply data, e.g., the corresponding account number, for comparison with the output of card reader 12. If there is no identity upon comparison, the customer may be so informed via the display device 22. An alarm (not shown) could be connected to ring after a given number of consecutive nonidentities.

The comparison means is located either in the control unit 14 or the memory 16, depending upon the details of implementation. For comparing the data, a comparator per se could be employed. On the other hand, if the control unit 14 is a computer processor, the arithmetic logic can perform this function. Thus, for example, the account number might be subtracted from the secret bank number in the arithmetic unit, in which a remainder of zero would indicate identity.

If an identity is found to exist upon comparison, a signal is sent from the control unit 14 to a unit 26 labeled "Check Supply, Punch and Dispatcher." This unit contains a supply of suitable checks which, in one form, may be punched cards. Upon receiving a signal from the control unit 14, a blank check is supplied from a hopper to a punch mechanism in unit 26, and the punch mechanism may enter into the card such information as the control unit 14 is programmed to transmit from the card reader 12 and/or memory system 16. In the usual case, the cusomer's account number along should suffice, although in some instances it may be desired also to punch in information designating the customer's name, date, etc. The unit 26 then dispenses the punched check 28 through a slot in the machine (to be described) to the customer.

The customer signs the check 28 and reinserts same into the machine, where it is supplied to punch unit 30. This punch 30 may be the punch located in unit 26 and described above, or it could be a separate punch mechanism. The customer also enters into the machine, via manual input device 34, the amount of money which he wishes to withdraw. Preferably, the input device 34 is the same device 18 described previously, whereby only a single manual input device is required. In that case, the display 22 will display the information entered by the customer for verification by him. A key 36 then is depressed by the customer and the punch 30 punches into the card (check) coded information designating the amount of money which the customer wishes to withdraw.

After the card has been punched, it is delivered to a reader and stacker 40, where it is read and then stacked in that order. The reader reads that portion of the card which contains the information designating the amount of money to be withdrawn. The output of the reader is transmitted to a currency storage and selector unit 42, labeled "Vault and Dispenser," which unit selects the desired amount of currency and delivers same 44 to the customer. In addition, the output of the reader may be supplied to the memory system via line 46 to update the customer's account or to keep track of the number of checks cashed by any one customer during a given period of time, thereby to prevent a customer from depleting the supply of money.

For practical purposes, it might be preferable to limit the amount of money which can be withdrawn to certain fixed values, such as $5, $10, $20, etc., in even amounts up to some maximum limit. By way of example only, the various denominations of money could be stored in separate envelopes in a machine which operates along the general lines of an article-dispensing apparatus, such as a candy or cigarette machine. In this system, however, the trip levers would be actuated by electronic signals from the reader 40 rather than by mechanical means such as are employed in the usual coin-operated vending machines.

The system of FIG. 1 has been described in terms of its basic functions. It should be apparent that alternatives can be employed and that more elaborate features can be included. For example, the checks, although described as punched cards, could be in the form of regular checks, in which case it might be preferable to print on the check rather than punching the check. Also, the check could be a magnetic type of card in which the information is entered by the machine in magnetic form. Provision might also be made via the display 22 to inform the user when the supply of money is exhausted or the machine is unoperative or the customer has already cashed his allotted number of checks for the given period. The memory system 16, depending upon its size, also could contain information to signify that the customer's balance is inadequate, or that he is on a so-called "bad-boy" list.

All of the devices in FIG. 1 except the manual input devices 18, 34 and the key 36 are located within the machine and are physically inaccessible to the customer. The manual input devices are located external to the machine, on the other hand, for the use by the customer. FIG. 2 is an example of one form of front panel for the check-cashing machine. In FIG. 2, a single manual input device 60 is shown, in which case the manual input devices 18 and 34 of FIG. 1 are one and the same. This keyboard device has depressable buttons for the various numerals zero through nine, and has also an erase button, the depression of which erases the information previously entered through the keyboard. Above the keyboard 60 is a verify panel 62 which displays the information entered by the keyboard. If the secret bank number of the amount to be withdrawn is incorrectly inserted, the error may be detected by checking the verify or display panel 62. The customer then may push the erase button and enter the correct information. When the information on the display panel 62 is correct, the information may be entered into the machine by depressing the entry bar 36.

Located above the verify panel 62 are three slots 64, 66 and 68. Slot 64 is the slot through which the customer inserts his identification or account card into the reader 12 (FIG. 1), and through which the card is sent back to the customer at the completion of the operation. The slot 66 dispenses the check from the supply and punch unit 26 (FIG. 1), and the slot 68 is the slot though which the customer reinserts the check after he has signed same. At the bottom of the panel is a slot 70 through which the envelope containing the desired amount of currency is dispensed to the customer from the vault and dispenser 42 (FIG. 1). As an aid to the customer, provision is made at the top of the panel for a set of printed instructions for the step-by-step operation of the machine.

If the banking institution determines that it is unnecessary for the customer to sign the check, the amount of money desired could be entered into the system by way of the manual input device 18 (FIG. 3) and this amount could be record on the check in unit 26 via the control unit 14. In that event, the check dispatched by unit 26 could be sent directly to the reader and stacker unit 40 without the need for sending it to the customer first for his signature and reinsertion into the system. The operation of the system otherwise is the same as that of the FIG. 1 system previously described.

On the other hand, if the signing of the check is to be omitted, it might also be determined that it is unnecessary even to employ the steps of recording on and reading a check. In that case, the check supply and recorder unit 26 and the reader and stacker unit 40 could be omitted from the system, and the vault and dispenser unit 42 could be controlled directly from the control unit 14. In such a system, the customer would insert his account card 10 into the reader 12 and would enter his secret bank number via the manual input device 18. The memory system would be addressed, as before, either by the card information or by the manual input information, and a comparison made between the information at the addressed location in the memory and the information on either the card 10 or the information entered via the keyboard 18. If the comparison indicates an identity, the customer then would insert information designating the desired amount of withdrawal through the manual input device 18 and, in response thereto, the control unit 14 would signal the vault and dispenser 42 directly via line 74 to dispense the requested amount of currency.

In order to keep a record of withdrawals in the latter event, the control unit also would supply information regarding the account number and the amount of withdrawal to the memory system 16. Alternatively, unit 26 could be a printer or tape perforator which would keep a running log of withdrawals by customer account number and the amount of withdrawal. In the case of a bank which has a central computing system, a printer and/or a tape punch is generally available as a piece of peripheral gear, in which case the unit 26 could be the system printer or tape punch.

A third embodiment of the invention is illustrated in block diagram form in FIG. 4. For the sake of completeness of disclosure, this system is shown as employing a digital computer system 80 having a memory 82, a processor 84 and an input/output control unit 86. It will be understood, of course, that these could be individual units rather than forming a part of a central data processing system. The overall system of FIG. 4 is similar generally to the systems of FIGS. 1 and 3, differing therefrom in that the use of standard checks is contemplated, and the checks are supplied by the customer rather than by the machine.

As is known, the usual procedure for cashing a check is for the account holder to fill in a blank check and to present same to the bank teller. In the FIG. 4 system, the customer fills in and signs the check, and then inserts same into a unit 87, labeled "Recorder and Stacker." The customer inserts his account card 10 into the reader 12 and enters his secret bank number into the system by the manual input device 18. A comparison of data is made, as in the previously described systems, and, upon identity of comparison, the customer is permitted to enter into the system, via manual input device 18, the amount of money which he wishes to withdraw. Upon the receipt of this information, the input/output device 86 supplies signals to the vault and currency dispenser 42 to dispense the correct amount of currency to the customer. In addition, the input/output device 86 transmits to the reorder 87 a sequencing number which is recorded on the check.

This sequencing number also is supplied to an auxiliary storage unit 88, such as a paper tape punch or a printer. The amount of withdrawal, and preferably the customer's account number, also are supplied to the auxiliary storage 88 via the input/output unit 86. By this means, a running account is kept by the auxiliary storage unit 88, in the order of sequence number, of the amounts of withdrawal and corresponding account numbers. At the commencement of the following business day, a bank clerk then can check the contents of the auxiliary storage 88 with the checks in the stacker unit 87 to verify that the customer has signed the check, that he has signed the check properly, that he has written on the check the proper amount, i.e., the amount which he has actually withdrawn, etc. If the computer system 80 has a large enough capacity, the auxiliary storage 88 could take the form of a portion of the computer memory 82.

I claim:

1. In combination:

input means for reading from an account card proffered by a customer a first code identifying that customer;

input means for receiving from the same customer a separately provided second code, different than the first, which also identifies the customer;

means including a memory having a location for each customer, responsive to the code received by one of said input means for reading from the location in said memory set aside for the customer identified by that code, the other identification code for that customer;

means for signalling whether the code produced by the memory is the same as the code received by the other of said input means;

a store of material;

means including the same input means as employed to receive said second code for indicating the amount desired of the material in said store; and means responsive to said last-named means and to said means for signalling for delivering from said store the requested amount of material.

2. The combination as set forth in claim 1, said first-mentioned input means comprising a card reader and said second-mentioned input means comprising a manually operated keyboard.

3. The combination as claimed in claim 1, including a display device presenting a visual display of the data entered via said manually operated input device.

4. The combination as claimed in claim 1, including means for receiving a manually inserted check, and means for recording an identifying notation on said check.

5. Apparatus comprising, in combination:
a. first input means including an input reader for reading a first customer identification code from a customer account card;
b. second input means including an input device for entering a second customer identification code, not present on said customer account card, into the apparatus;
c. memory means addressed by the output of one of said input means;
d. said memory having a location for each customer and storing, at each such location, the customer identification code required to be applied to the other of said input means for a proper identification of the customer;
e. means for comparing the output of the addressed memory location with the code applied to said other input means;
f. a hopper for a supply of blank "checks";
g. a recorder for said "check";
h. means responsive to an identity of comparison, in (e) above, for feeding a "check" from said hopper to said recorder and for recording thereon data identifying the customer account corresponding to the second identification code;
i. a manually operated input device for entering data representing a desired amount of currency;
j. means for recording on said "check" the output of said manually operated input device;
k. a "check" reader connected to receive the "check" from said recording means and operative to read the data thereon denoting the desired amount of currency;
l. a currency storage unit; and
m. means responsive to the output of said reader for retrieving from said currency storage unit said desired amount of currency.

6. The combination as claimed in claim 5, wherein said manually operated input device and said input device of said second input means are one and the same unit.

7. The combination as claimed in claim 6, wherein the "check" is dispatched from said recorder to a user for his signature and manual insertion into said recording means.

8. The combination as claimed in claim 7, wherein said recorder and said means for recording are one and the same recording device.

9. A computer-controlled credit card user identification system comprising, in combination:

input means responsive to credit card provided by the user for reading a number from said card;

input means for receiving from the same user a separately provided number, that is, a number provided by the user which is not read from the credit card;

means including a memory having a location for each user responsive to an indication of the number applied by a user to one of said input means for reading from the location in memory for that user an indication separately of the number required to be applied to the other input means for credit to be granted; and means coupled to said last-named means and to said other input means for signalling whether the number indicated by the last-named means is the same as the number applied to said other input means.

10. Apparatus for supplying money comprising, in combination:

a store of money;

means responsive to a customer identification card and to an identification code separately provided by the customer, that is, a code neither present on nor read from said card, for producing a signal to indicate whether or not said customer is authorized to receive money from said store of money, said means including a memory, means for translating information on said card to a memory address, and comparator means for comparing the contents of a memory location called for by said address with the separately provided customer identification code;

means responsive to a request for a specific amount of said money and to said signal which indicates that said customer does have such authority, for supplying from said store of money said specific amount of money; and means responsive to said request for said specific amount of money for making a record of the identification of and the amount of money supplied to said customer.

11. In the combination as set forth in claim 10 said means responsive to an identification code separately provided by the customer including a keyboard actuated by said customer.

12. In the combination as set forth in claim 10, said last-named means including the same keyboard as set forth in claim 11.

13. Apparatus for supplying money comprising, in combination:

a store of money;

means responsive to a customer identification card and to an identification code separately provided by the customer, that is, a code neither present on nor read from said card, for producing a signal to indicate whether or not said customer is authorized to receive money from said store of money, said means including a memory, means for translating said separately provided customer identification code to a memory address, and comparator means for comparing the contents of a memory location called for by said address with information on said identification card;

means responsive to a request for a specific amount of said money and to said signal which indicates that said customer does have such authority, for supplying from said store of money said specific amount of money; and means responsive to said request for said specific amount of money for making a record of the identification of and the amount of money supplied to said customer.